United States Patent
Dasari et al.

(10) Patent No.: US 8,352,304 B2
(45) Date of Patent: Jan. 8, 2013

(54) SYSTEM AND METHOD FOR ALLOCATING JOBS TO AN AGENT

(75) Inventors: Arundat Mercy Dasari, Bangalore (IN); Amit Vikram, Bangalore (IN); Vineet Kumar Vashishtha, Bangalore (IN); Sumanta Basu, Bangalore (IN)

(73) Assignee: Wipro Limited, Bangalore, Karnataka (IN)

( * ) Notice: Subject to any disclaimer, the term of this patent is extended or adjusted under 35 U.S.C. 154(b) by 592 days.

(21) Appl. No.: 12/265,733

(22) Filed: Nov. 6, 2008

(65) Prior Publication Data
US 2010/0114785 A1 May 6, 2010

(51) Int. Cl.
*G06Q 10/00* (2006.01)
*G06Q 30/00* (2006.01)

(52) U.S. Cl. ............... 705/7.21; 705/7.18; 705/7.31
(58) Field of Classification Search ......... 705/7.11–7.42
See application file for complete search history.

(56) References Cited

U.S. PATENT DOCUMENTS

| | | | | |
|---|---|---|---|---|
| 5,671,361 | A * | 9/1997 | Brown et al. | 705/7.23 |
| 6,499,024 | B1 * | 12/2002 | Stier et al. | 706/50 |
| 6,601,035 | B1 * | 7/2003 | Panagos et al. | 705/7.22 |
| 2002/0065702 | A1 * | 5/2002 | Caulfield | 705/9 |
| 2006/0265276 | A1 * | 11/2006 | Weller et al. | 705/10 |
| 2007/0198314 | A1 * | 8/2007 | Andrew et al. | 705/8 |
| 2008/0162242 | A1 * | 7/2008 | Schneur et al. | 705/9 |
| 2008/0263323 | A1 * | 10/2008 | Mould et al. | 712/42 |
| 2009/0043634 | A1 * | 2/2009 | Tisdale | 705/9 |

OTHER PUBLICATIONS

Wil M.P. van der Aalst, Michael Rosemann, Marlon Dumas, Deadline-based escalation in process-aware information systems, Decision Support Systems, vol. 43, Issue 2, Emerging Issues in Collaborative Commerce, Mar. 2007, pp. 492-511, ISSN 0167-9236, DOI: 10.1016/j.dss.2006.11.005.*

Estimating Lost Labor Productivity in Construction Claims. TCM Framework: 6.4—Forensic Performance Assessment. AACE International Recommended Practice No. 25R-03. Accesses at http://www.sde-us.com/docs/emailblasts/JetBlue/LostLabor.abor.pdf.*

* cited by examiner

*Primary Examiner* — Jason Dunham
*Assistant Examiner* — Richard Scheunemann
(74) *Attorney, Agent, or Firm* — Prakash Nama; Global IP Services, PLLC

(57) ABSTRACT

A system and method for allocating jobs to an agent is disclosed. In one embodiment, a method for allocating jobs to an agent includes defining, for each job of the jobs, a job type associated with at least one job and at least one sub-step associated with the at least one job, determining eligibility to perform the at least one sub-step by an agent of agents, determining a number of jobs of each job type to be performed by the agent based on the eligibility determination, and automatically generating agent-specific job queues based on the number of jobs.

13 Claims, 9 Drawing Sheets

|  | SUB-STEPS | | | | | |
|---|---|---|---|---|---|---|
| | A1S1 | A1S2 | B1S1 | B1S2 | C1S1 | SUPPLY |
| AG1 | 0 | 0 | F13 | F14 | 0 | A1 |
| AG2 | F21 | F22 | F23 | F24 | 0 | A2 |
| AG3 | F31 | F32 | F33 | F34 | F35 | A3 |
| | B1 | B2 | B3 | B4 | B5 | |

AGENTS (left label), SUPPLY (right label), DEMAND (bottom label)

— 600

SYSTEM AND METHOD FOR ALLOCATING JOBS TO AN AGENT

FIELD OF TECHNOLOGY

Embodiments of the present invention relate to the field of business process outsourcing. More particularly, embodiments of the present invention relate to a system and method for allocating jobs to an agent.

BACKGROUND

Organizations that outsource business processes may do so with an expectation of consistent performance level as per a predefined level of service, i.e., to meet or exceed service level agreement (SLA) parameters. The execution of the business processes thus faces a major challenge in finding a way to allocate jobs to agents to maximize the probability of meeting the business objectives. Further, a complexity dynamic is added, if one considers the different type of jobs versus the various agents' skill sets. Still further, due to the need for human intervention in work allocation, performance of a business process may be highly dependent on abilities of humans, making the business process prone to inefficiencies and errors. Also, a challenge may be faced in attempting to map the jobs to the agents in such a way that the associated allocation leads to optimal throughput of the jobs in the system while ensuring that required quality levels are maintained and costs, remaining within budget.

BRIEF DESCRIPTION OF THE DRAWINGS

Embodiments of the present invention are illustrated by way of examples and not limited to the figures of the accompanying drawings, in which like references indicate similar elements and in which.

Other features of the present embodiments will be apparent from the accompanying drawings and from the detailed description that follow.

DETAILED DESCRIPTION

A system and method for allocating jobs to an agent is disclosed. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

The terms "sub-step job" and "sub-step" are interchangeably used throughout the document.

Figure 1:
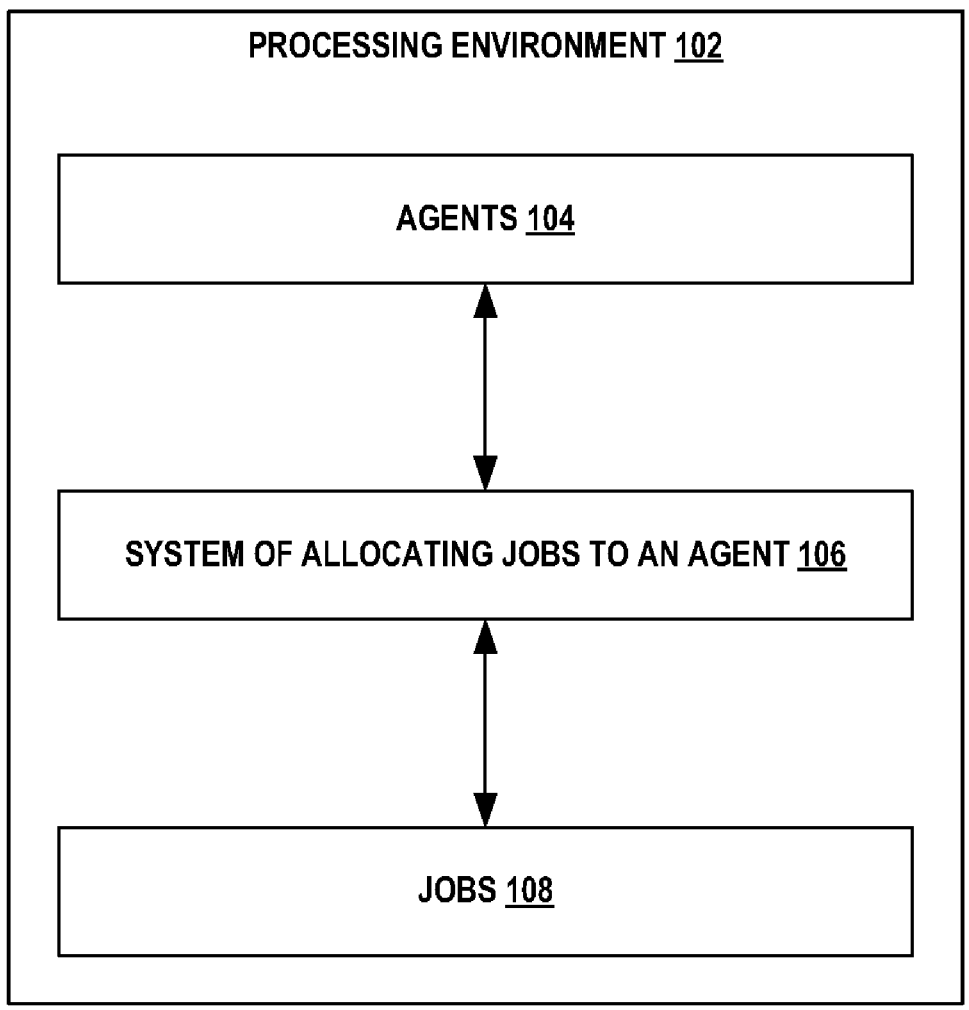
FIG. 1 illustrates a block diagram showing a system of allocating jobs to an agent, according to one embodiment.

FIG. 1 illustrates a block diagram 100 showing a system of allocating jobs to an agent 106, according to one embodiment. As shown in FIG. 1, a processing environment 102 includes agents 104, jobs 108 and the system of allocating jobs to an agent 106 for facilitating optimal allocation of the jobs 108 to the agents 104. The jobs 108 may be jobs having one or more sub-steps which are identified by the system of allocating the jobs to an agent 106. Further, each job may be associated with a job type.

In one exemplary implementation, each job may include "n" number of sub-steps and the number of sub-steps in each job type may be different. In one embodiment, sub-steps of a particular job type are performed in a sequence. For example, if a job type has three sub-steps 1, 2 and 3, then the sub-step 1 is performed before sub-step 2 and the sub-step 3. The sub-step 2 is dependent on completion of the sub-step 1 and the sub-step 3 is dependent on completion of the sub-steps 1 and 2. It is appreciated that each of the sub-steps of a particular multi-step job can be performed by a single agent 104 or a combination of agents 104.

The agents 104 may include individuals or a group of individuals having skills and/or capability to process the sub-steps associated with the one or more than one job type. Further, relative skill levels of the agents 104 may vary with respect to the sub-steps of each job of the jobs 108 (associated with the similar or different job types). For example, a job type A has two sub-steps and a job type B has two sub-steps. In such a case, one agent may be more skilled in performing sub-step 1 of the job type A than in performing sub-step 2 of the job type A. Also, the same agent may be more skilled in performing sub-step 2 of the job type B.

The system of allocating jobs to an agent 106 allocates the jobs 108 to the agents 104 based on a criteria, e.g., eligibility criteria which is configured by a person responsible for processing of a particular job and job type using a menu driven user interface. In one exemplary implementation, the system of allocating jobs to an agent 106 determines most optimal allocation of each of the sub-steps associated with each job of the jobs 108 to the agents 104, with each of the sub-steps associated with each job of the jobs 108 being treated as an individual job to be performed by the agents 104.

Further, with reference to the above example, optimal allocation of the jobs 108 to the agents 104 can be achieved using the system of allocation jobs to an agent 106 such that the agent 104 processes the sub-step 1 of the job type A as well as the sub-step 2 of the job type B. However, the system of allocating jobs to an agent 106 may not allow the agent 104 to perform sub-step 2 of the job type A. Further, the sub-step 1 of the job type B may be processed by another agent 104 who is capable of performing the sub-step 1 of the job type B.

It is appreciated that the system of allocating jobs to an agent 106 allows more than one sub-step associated with the jobs 108 to be assigned to a single agent 104. It is also appreciated that the system of allocating jobs to an agent 106 allows the agent 104 to be authorized to perform sub-steps from more than one job type.

Figure 2:
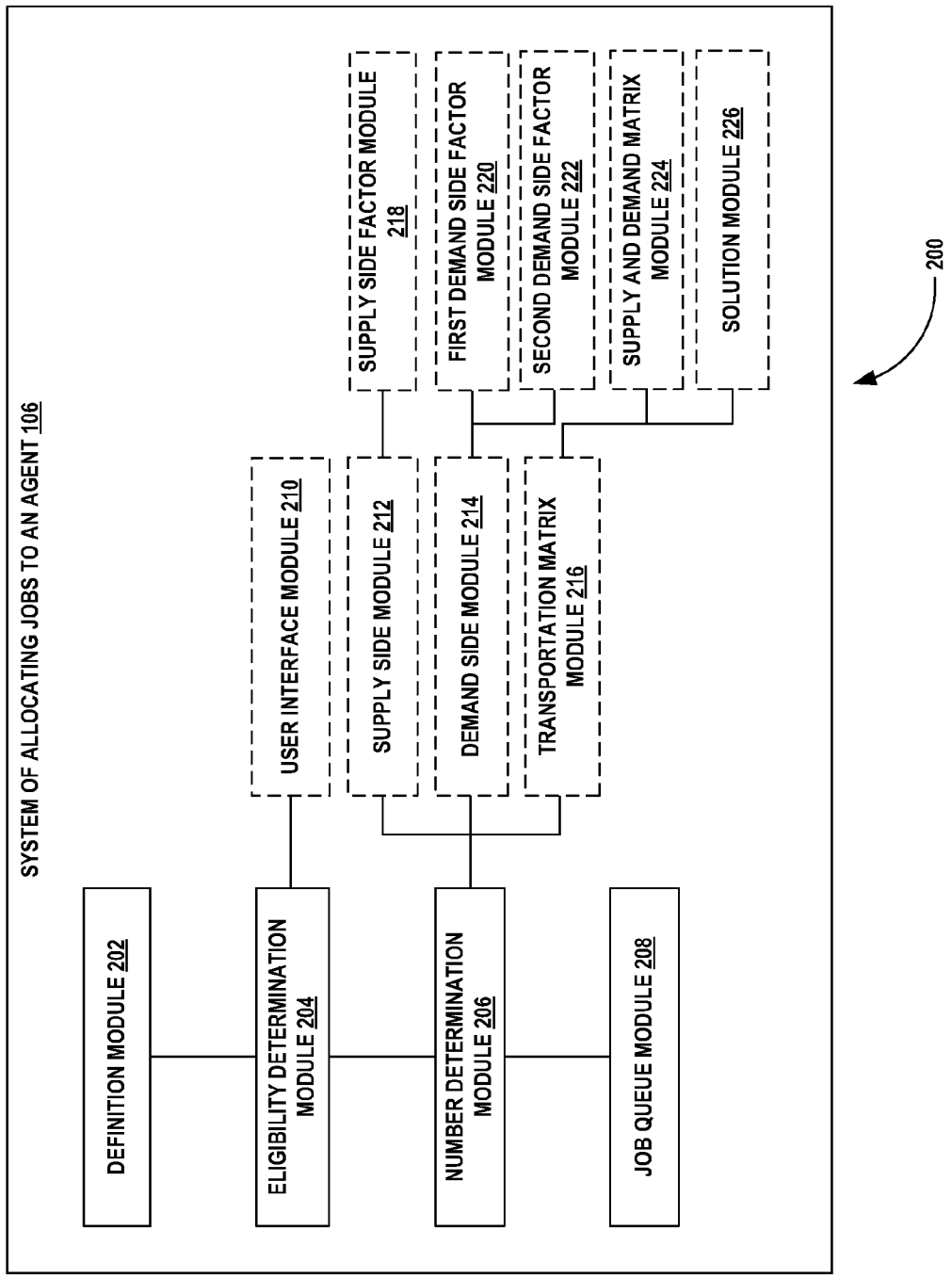
FIG. 2 illustrates a block diagram showing various modules associated with the system of allocating jobs to an agent of FIG. 1, according to one embodiment.

FIG. 2 illustrates a block diagram 200 showing various modules associated with the system of allocating jobs to an agent 106 of FIG. 1, according to one embodiment. Particularly, FIG. 2 illustrates a definition module 202, an eligibility determination module 204, a number determination module 206 and a job queue module 208.

In operation, the definition module 202 defines for each job, a job type associated with the job, e.g., of the jobs 108 of FIG. 1 and a sub-step associated with the job 108. The eligibility determination module 204 determines eligibility to perform the sub-step by an agent, e.g., of the agents 104 of FIG. 1. The number determination module 206 determines a number of jobs of each job type to be performed by the agent 104 based on the eligibility determination. The job queue module 208 automatically generates agent-specific job queues based on the number of jobs.

As shown in FIG. 2, the eligibility determination module 204 includes a user interface module 210 for authorizing the agent 104 to perform the job 108. Further, as shown in FIG. 2, the number determination module 206 includes a supply side module 212, a demand side module 214 and a transportation matrix module 216. In one embodiment, the supply side module 212 calculates a supply side factor for each agent 104. As shown in FIG. 2, the supply side module 212 includes a supply side factor module 218 for calculating the supply side factor for each agent 104. In one exemplary implementation, the supply side factor for each agent is calculated using the formula:

$$\eta = \alpha \times \beta,$$

where, $\eta$ is the supply side factor, $\alpha$ is a direct work efficiency, $\beta$ is an indirect work efficiency/productivity, where, $$\alpha = \frac{W - Wr}{W},$$

where, W is number of hours worked by the agent 104, Wr is number of hours spent in rework activities, and where, $$\beta = \frac{J_a}{J_d},$$

where, $J_a$ is number of jobs done by a particular agent in a day, and $J_d$ is average number of jobs done by all agents 104.

In another embodiment, the demand side module 214 calculates a demand side factor for each sub-step associated with the job 108. As shown in FIG. 2, the demand side module 214 includes a first demand side factor module 220 and a second demand side factor module 222. In one embodiment, the first demand side factor module 220 calculates the demand side factor for each sub-step associated with the job 108 using the formula:

$$ds_f = P \times C_x \times C_r,$$

where, $ds_f$ is the demand side factor, $C_x$ is a complexity factor and takes a normal complexity value of 0, a medium complexity value of 0.5, and a high complexity value of 1.0 and $C_r$ is a customer request factor and takes a no customer priority value of 0, a medium customer priority value of 1, and a high customer priority value of 2, and where, $$P = \frac{t_p}{TAT},$$

where, P is an aging priority of the sub-step job calculated by the system, TAT is a turn around time for the sub-step job, and $t_p$ is a time passed after starting the job 108. In another embodiment, the second demand side factor module 222 calculates the demand side factor for each sub-step associated the job 108 using the formula:

$$ds_f = \frac{SHT}{TAT} \times \frac{1}{y_n},$$

where, $ds_f$ is the demand side factor, SHT is a standard handling time of performing a particular sub-step job, TAT is a turn around time to complete the sub-step job, including handling times and waiting times, and $y_n$ is number of agents suitable to handle the sub-step job.

Although, the above description explains two methods to determine the demand side factor, one can envision that the system may use other methods which allow it to assign a demand side factor to each of the sub-step job.

Furthermore, the transportation matrix module 216 generates and solves a transportation matrix using the supply side factor and the demand side factor. As shown in FIG. 2, the transportation matrix module 216 includes a supply and demand matrix module 224 and a solution module 226. In one embodiment, the supply and demand matrix module 224 generates an n×m matrix, where, n represents demand side and m represents supply side. In this embodiment, the solution module 226 solves the transportation matrix using the formula:

$$\text{maximize } Z = \sum_{i=1}^{m} \sum_{j=1}^{n} Fij \times Xij,$$

where, Z represents an objective function, $F_{ij}$ represents $i^{th}$ row and $j^{th}$ column of the transportation matrix and is defined as a product of the demand side factor ($ds_f$) of the $j^{th}$ sub-step and the supply side factor ($\eta$) of the $i^{th}$ agent and $X_{ij}$ is number of the jth column sub-step job assigned to the $i^{th}$ row agent, subjected to constrain equations:

$$\sum_{j=1}^{n} Xij = a_i, \quad i = 1, 2, \ldots, m,$$

$$\sum_{i=1}^{m} Xij = b_j, \quad j = 1, 2, \ldots, n,$$

and $$\sum_{i=1}^{m} a_i = \sum_{j=1}^{n} b_j$$

The following are the possibilities of the constrain equations:
1) If $$\sum_{i=1}^{m} a_i = \sum_{j=1}^{n} b_j,$$

then the transportation matrix is balanced since jobs 108 allocated cannot be more than agents' capacity,
2) If $$\sum_{i=1}^{m} a_i > \sum_{j=1}^{n} b_j,$$

then the agents 104 having a scope to process additional jobs 108 are selected, and
3) If $$\sum_{i=1}^{m} a_i < \sum_{j=1}^{n} b_j,$$

then top jobs are selected based on respective demand side factors and a remainder of the jobs are left for a later cycle of optimal allocation.

The objective function Z is maximized since a high priority job is assigned to a highly efficient agent in such a way that processing of the job takes minimum time, no agent remains idle and no job remains unprocessed. In other words, the product of $F_{ij}$ and $X_{ij}$ is maximized.

Figure 3:
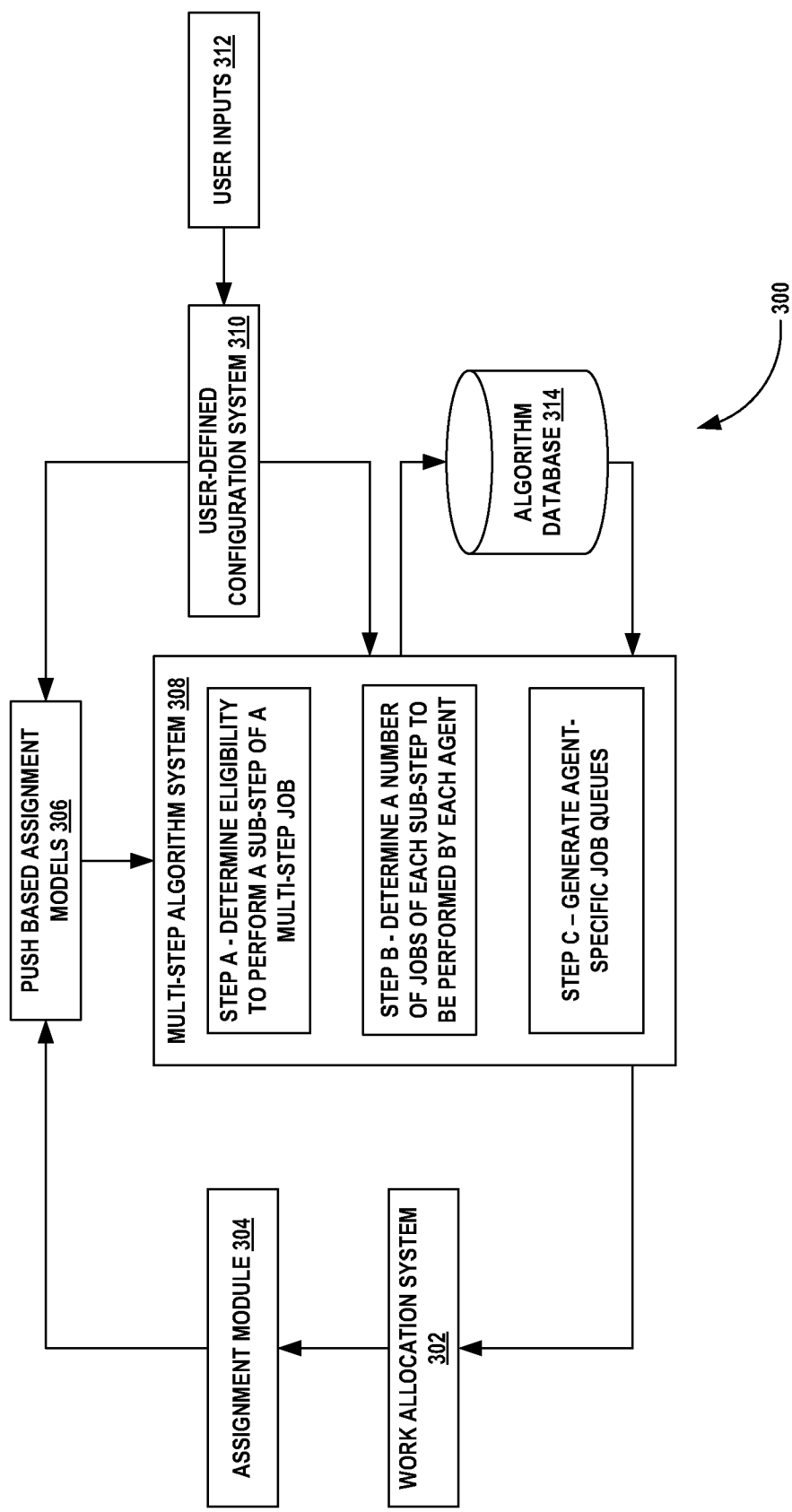
FIG. 3 illustrates a high level interaction between a work allocation system, an algorithm system, and an user-defined configuration system, according to one embodiment.

FIG. 3 illustrates a high level interaction 300 between a work allocation system 302 an algorithm system, and a user-defined configuration system 310, according to one embodiment. Particularly, FIG. 3 illustrates the work allocation system 302, an assignment module 304, push based assignment models 306, a multi-step algorithm system 308, the user-defined configuration system 310, user inputs 312 and an algorithm database 314. In some embodiments, the work allocation system 302 enables allocation of jobs, e.g., the jobs 108 of FIG. 1 to agents, e.g., the agents 108 of FIG. 1 for processing.

In one exemplary implementation, the work allocation system 302 selects a particular assignment model for allocating the jobs to the agents. In one embodiment, the work allocation system 302 interacts with the assignment module 304 to select one of the assignment models built into the assignment module 304. It is appreciated that the selection is based on the user inputs 312 provided through the user-defined configuration system 310 (based on a rules-based framework). The user inputs 312 are pre-configured into the user-defined configuration system 310 by a process administrator. The process administrator may define business requirements, process requirements, and the like through a user interface, e.g., a menu driven user interface.

In one example embodiment, the user-defined configuration system 310 allows the process administrator to stipulate rules at two levels, viz., first level of configuration allows the work allocation system 302 to select an assignment model, which is most suited to a business process from the available assignment models, and second level of configuration allows the work allocation system 302 to choose from various algorithms which are part of the selected assignment model. It is appreciated that the assignment module 304 includes a number of assignment models built into it and each of the assignment models has a number of algorithms built into the assignment models.

Further, it should be noted that the process administrator may configure a system in such a way that the work allocation system 302 has access to only a particular set of assignment models. In one exemplary implementation, the work allocation system 302 may be restricted to access only pull based algorithms. Such a business rule(s) may be placed by the process administrator on the system, if the pull based algorithms provide the most optimal solution.

The algorithm database 314 as shown in FIG. 3 includes a number of algorithms which may be used by the algorithm system to determine a priority sequence of execution of the jobs in the system. In one exemplary implementation, the selection of the algorithm is dependent on a process type and this requirement is configured into the system by the process administrator. In one example embodiment, the push based assignment model 306 may instruct the algorithm system to select the multi-step algorithm 308 from the algorithm database 314 to optimally allocate the jobs, e.g., multi-step jobs to the agents.

Further, as shown in FIG. 3, implementing the multi-step algorithm 308 includes the following steps. In step A, eligibility of the agents to perform each sub-step of the multi-step job is determined. For example, each sub-step is considered as an individual job to be processed by an agent. It is appreciated that, the eligibility to perform a sub-step of a job by an agent is configured by a person responsible for that process of that job and job type, such as an operations manager, a team lead and the like. In one embodiment, the user-defined configuration system 310 provides a menu driven user interface to authorize an agent to process a particular sub-step of the job. It is appreciated that, the system may allow more than one sub-step to be assigned to the agent. It is also appreciated that, the system may allow the agent to be authorized to perform sub-steps from more than one job type.

In step B, a number of jobs of each sub-step to be performed by each agent are determined. In one embodiment, the determination of the number of jobs include calculation of a supply side factor for each agent, calculation of a demand side factor for each sub-step job and generating and solving a transportation matrix including a supply side and a demand side. Further, in step C, agent-specific job queues are generated automatically based on the number of jobs. In one example embodiment, the agent-specific job queues are dynamic in nature and are rebuilt at moderate intervals based on the demand side factor. For instance, any second sub-step job cannot be executed unless its related first sub-step job has been executed. For example, if an agent has B2 and C1 sub-step jobs, and if priority of a B group job is higher than a C group job, then the agent executes B2 sub-step job first. If B1 sub-step job has not been executed, then the agent may execute the C1 sub-step job.

Further, first sub-step jobs are placed on top of the agent-specific job queue and then second sub-step jobs are placed. Suppose in a queue of an agent AG1, a second sub-step job B2 has a higher priority than a first sub-step job A1. In this case, another agent, for example, AG2 who is allocated a sub-step job B1, may complete the sub-step job B1 and hence the sub-step job B2 is kept above the first sub-step job A1 in queue of the agent AG1. In one exemplary implementation, if an agent is handling sub-steps that are having two or more than two consecutive sub-steps, later jobs are followed by corresponding previous sub-steps. Further, the steps A, B and C are described in greater detail in FIGS. 4, 5, 6 and 7.

Figure 4:
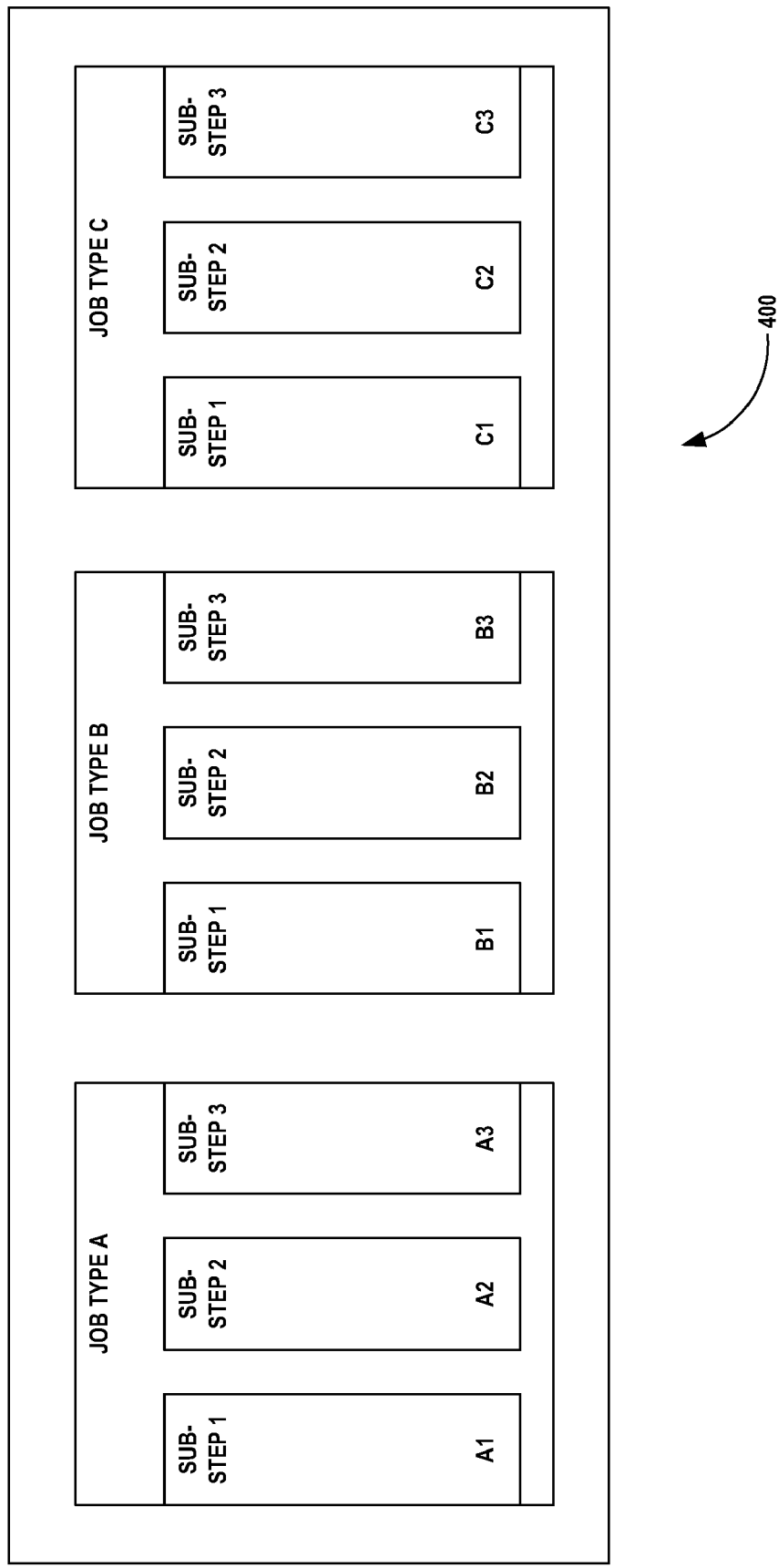
FIG. 4 illustrates a block diagram showing various job types and sub-steps associated with the job types in a system, according to one embodiment.

FIG. 4 illustrates a block diagram 400 showing various job types and sub-steps associated with the job types in a system, according to one embodiment. Particularly, FIG. 4 illustrates job types A, B and C. Further, it can be seen from FIG. 4 that, each job type is having three sub-steps. As shown in FIG. 4, the job type A includes sub-steps A1, A2 and A3, the job type B includes sub-steps B1, B2 and B3, and the job type C includes sub-steps C1, C2 and C3.

It should be noted that, the sub-steps of each job type need to be performed in a sequence. The sub-step A2 is dependent on completion of the sub-step A1 and the sub-step A3 is dependent on completion of the sub-steps A1 and A2. So, the sub-step A1 needs to be performed before the sub-steps A2 and A3. It is appreciated that each of the sub-steps of a particular multi-step job can be performed by a single agent or a combination of a number of agents.

Figure 5:
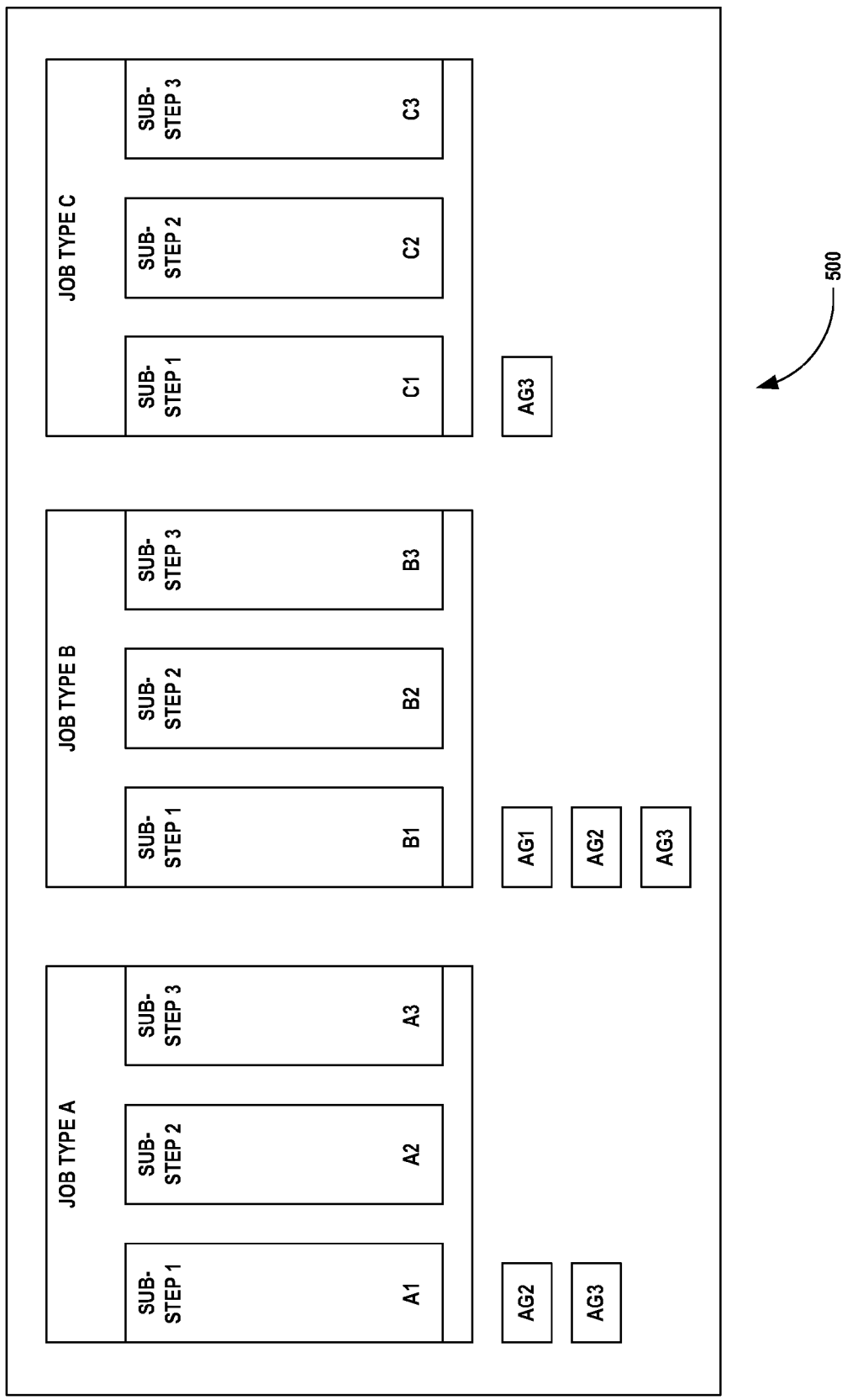
FIG. 5 illustrates a block diagram showing an exemplary authorization of agents to perform the sub-steps associated with the job types shown in FIG. 4, according to one embodiment.

FIG. 5 illustrates a block diagram 500 showing an exemplary authorization of agents to perform the sub-steps associated with the job types shown in FIG. 4, according to one embodiment. Particularly, FIG. 5 shows the authorization of agents AG1, AG2 and AG3 to perform a first sub-step of each job type (i.e., the sub-steps A1, B1 and C1 of the job types A, B and C, respectively). As shown in FIG. 5, the agent AG1 is authorized to process the sub-step B1, the agent AG2 is authorized to perform the sub-steps A1 and B1 and the agent AG3 is authorized to perform the sub-steps A1, B1 and C1. It should be noted that, any agent may be authorized to perform any sub-step of any job type based on the agent's eligibility, user inputs, business requirements, etc.

Figure 6:
FIG. 6 illustrates an exemplary transportation matrix generated based on the authorization of agents shown in FIG. 5, according to one embodiment.

FIG. 6 illustrates an exemplary transportation matrix 600 generated based on the authorization of agents shown in FIG. 5, according to one embodiment. Particularly, FIG. 6 illustrates a 3×5 matrix, where, '3' represents supply side and '5' represents demand side. In some embodiments, the transportation matrix 600 is used to determine number of jobs of each sub-step to be performed by each agent and then assign the sub-steps to the agent. In the example embodiment illustrated in FIG. 6, the transportation matrix 600 is generated and solved by the system for the first sub-step of all job types, e.g., the job types A, B and C as illustrated in FIG. 5.

For generating the transportation matrix 600, it is assumed that the jobs are pushed in the system in batches and not pushed continuously. In other words, at some moment of time, there may be jobs with different demand side factors and belonging to the same sub-step. As illustrated in FIG. 6, the sub-step A1 has two sets of job (A1S1 and A1S2) which has different demand side factors. Similarly, the sub-step B1 has two sets of jobs (B1S1 and B1S2) having different demand side factors and the sub-set C1 has only one set of job (C1S1).

Further, A1, A2 and A3 represent maximum capacity of agents AG1, AG2 and AG3, and B1, B2, B3, B4 and B5 represent number of sub-step jobs corresponding to A1S1, A1S2, B1S1, B1S2 and C1S1, respectively. $F_{ij}$ represents the $i^{th}$ row and $j^{th}$ column of the transportation matrix 600 and is defined as a product of the demand side factor ($ds_f$) of the $j^{th}$ sub-step and the supply side factor ($\eta$) of the $i^{th}$ agent.

For example, $F_{13}$ is a product of the demand side factor ($ds_f$) and the supply side factor ($\eta$) of the agent AG1 and the sub-step job B1S1. $F_{33}$ is a product of the demand side factor ($ds_f$) and the supply side factor ($\eta$) of the agent AG3 and the sub-step job B1S1. If $F_{ij}$ is zero, it implies that the $i^{th}$ agent is not authorized to process the $j^{th}$ sub-step job. For example, the agent AG1 is not authorized to process the sub-step job A1S1, according to the example embodiment illustrated in FIG. 6.

Further, $X_{ij}$ represents number of the $j^{th}$ column sub-step job assigned to the $i^{th}$ row agent. For example, $X_{12}$ is the number of the sub-step jobs B1 assigned to the agent AG1 and $X_{31}$ is the number of the sub-step jobs A1 assigned to the agent AG3.

In accordance with the above described embodiments, the transportation matrix 600 ensures that higher efficient agents are assigned higher priority jobs, more efficient agents are assigned more jobs and no agent remains idle. In one embodiment, the system generates one transportation matrix for the first sub-step of all the job types. The system then generates another transportation matrix for the second sub-step of all the job types and so on. It should be noted that, the number of transportation matrices being generated depends on the number of levels of the sub-steps in all the job types.

For example, if there are four job types out of which three job types have four sub-steps each and one job type has five sub-steps, then the number of transportation matrices generated by the system is five. Alternatively, if there are four job types out of which three job types have four sub-steps each and one job type has only three sub-steps, the number of transportation matrices being generated by the system is four. In one example embodiment, the transportation matrix generated by the system may be a rectangular 2-dimensional matrix of any size.

In accordance with the above described embodiments, the transportation matrix 600 is solved for allocating jobs to the agents. In these embodiments, the transportation matrix 600 is solved enables allocation of the jobs to the agents using the formula:

$$\text{maximize } Z = \sum_{i=1}^{m} \sum_{j=1}^{n} Fij \times Xij,$$

where, $F_{ij}$ is a product of the demand side factor ($ds_f$) of the $j^{th}$ sub-step and the supply side factor ($\eta$) of the $i^{th}$ agent and $X_{ij}$ is number of the $j^{th}$ column sub-step job assigned to the $i^{th}$ row agent, subjected to constrain equations:

$$\sum_{j=1}^{n} Xij = a_i, \quad i = 1, 2, \ldots, m,$$

$$\sum_{i=1}^{m} Xij = b_j, \quad j = 1, 2, \ldots, n,$$

and $$\sum_{i=1}^{m} a_i = \sum_{j=1}^{n} b_j.$$

Further, the following are the possibilities in the constrain equations:
1) If $$\sum_{i=1}^{m} a_i = \sum_{j=1}^{n} b_j,$$

then the transportation matrix 600 is balanced since jobs allocated cannot be more than agents' capacity.

2) If $$\sum_{i=1}^{m} a_i > \sum_{j=1}^{n} b_j,$$

then the agents having a scope to process additional jobs are selected. In this manner, it is possible to arrive at $$\sum_{i=1}^{m} a_i = \sum_{j=1}^{n} b_j.$$

3) If $$\sum_{i=1}^{m} a_i < \sum_{j=1}^{n} b_j,$$

then top jobs of the jobs based on respective demand side factors are selected and a remainder of the jobs are left for later cycle of optimal allocation. In this manner, it is possible to arrive at $$\sum_{i=1}^{m} a_i = \sum_{j=1}^{n} b_j.$$

In one embodiment, the objective function Z is maximized since high priority job are assigned to highly efficient agent in such a way that minimum time is consumed for processing of the job, no agent remains idle and no job remains unprocessed. This can be achieved by maximizing the product of $F_{ij}$ and $X_{ij}$.

In accordance with the above described embodiments, the system solves the transportation matrix 600 for the first sub-step of all job types. Similarly, the system solves a transportation matrix for the second sub-step, the third sub-step and so on. In one example embodiment, each of the transportation matrix forms an input to a genetic algorithm which then solves the transportation matrix to generate a required output, viz., maximum number of jobs of each sub-step to be performed by each agent, i.e., $X_{ij}$.

Figure 7:
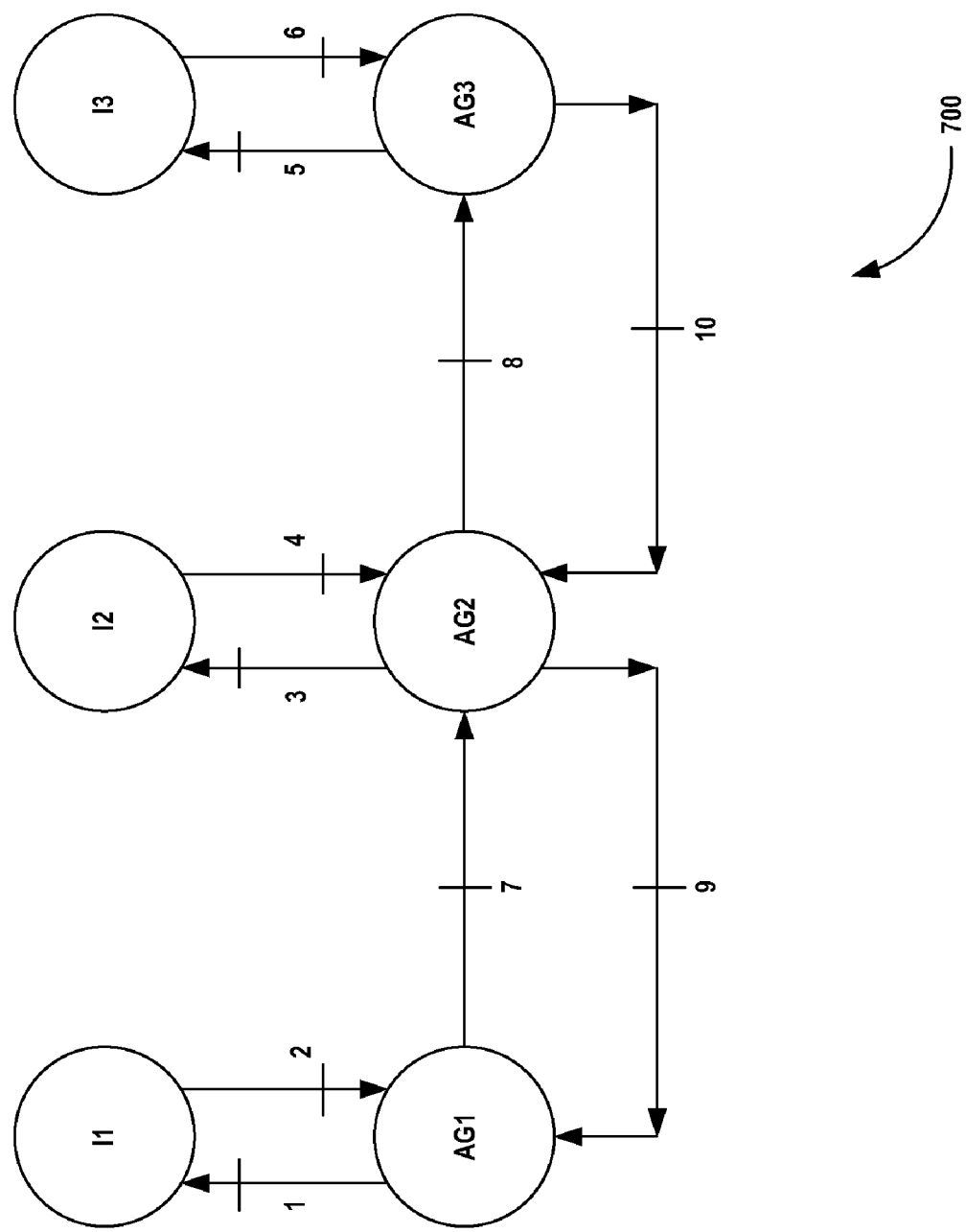
FIG. 7 illustrates a model for execution of sub-step jobs of the various job types by the agents, according to one embodiment.

FIG. 7 illustrates a model 700 for execution of sub-step jobs of various job types by the agents, according to one embodiment. In one exemplary implementation, the sub-step jobs are executed by the agents using a petri-net model, e.g., used in work flow models. Particularly, FIG. 7 illustrates a petri-net model for a three sub-step jobs, e.g., associated with a particular job, where three agents are authorized to perform the three sub-step jobs.

It can be seen from FIG. 7 that, there are as many number of petri-net as the number of sub-step jobs. In one example embodiment, the agents, e.g., AG1, AG2 and AG3 switch to the next sub-step job with the help of petri-net. As shown in FIG. 7, nodes AG1, AG2, AG3 represent agents. Suppose, if a transition 7 is fired, job moves from the agent AG1 to the agent AG2, i.e., the job goes from a first sub-step to a second sub-step. Further, if the job is to be moved from the second sub-step to a third sub-step, then transition 8 needs to be fired. In FIG. 7, nodes I1, I2 and I3 represent idling condition.

Suppose that an agent finds an error in the first sub-step, then by firing transition 1, the first sub-step job is moved from the agent AG1 to the node I1. This means that the first sub-step job is moved from the first sub-step to the idling condition. As shown in FIG. 7, transitions 1, 3 and 5 move the jobs from a particular sub-step to an idling condition and transitions 2, 4 and 6 move the jobs from an idling condition to a particular sub-step. Further, as shown in FIG. 7, transitions 9 and 10 move the jobs to previous sub-steps.

Figure 8:
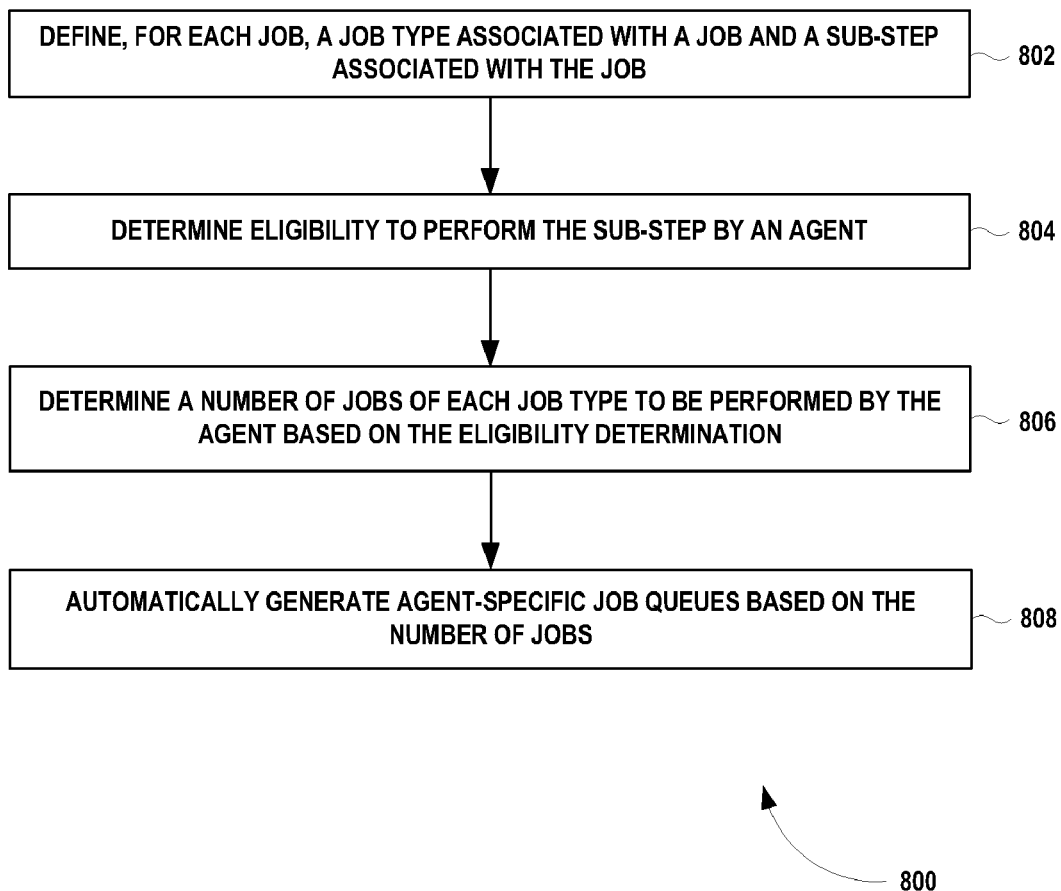
FIG. 8 illustrates a process flowchart of an exemplary method for the allocation of the jobs to an agent, according to one embodiment.

FIG. 8 illustrates a process flowchart 800 of an exemplary method for allocation of jobs to an agent, according to one embodiment. In operation 802, for each job, a job type associated with a job and a sub-step associated with the job is defined. In operation 804, eligibility to perform the sub-step by an agent is determined. For example, eligibility determination includes authorizing the agent to perform the job via a user interface. In operation 806, a number of jobs of each job type to be performed by the agent are determined based on the eligibility determination.

In some embodiments, determination of the number of jobs includes calculating a supply side factor for each agent, calculating a demand side factor for each sub-step associated with a job, and generating and solving a transportation matrix using the supply side factor and the demand side factor. In this embodiment, the supply side factor calculation includes calculating the supply side factor for each agent using the formula:

$$\eta = \alpha \times \beta,$$

where, $\eta$ is the supply side factor, $\alpha$ is a direct work efficiency and $\beta$ is an indirect work efficiency/productivity, and where, $$\alpha = \frac{W - W_r}{W},$$

where, W is number of hours worked by an agent, Wr is number of hours spent in rework activities, and where, $$\beta = \frac{J_a}{J_d},$$

where, $J_a$ is number of jobs done by a particular agent in a day, and $J_d$ is average number of jobs done by all agents.

In one embodiment, the demand side factor calculation includes calculating the demand side factor for each sub-step associated with the job using the formula:

$$ds_f = P \times C_x \times C_r,$$

where, $ds_f$ is the demand side factor, $C_x$ is a complexity factor and takes a normal complexity value of 0, a medium complexity value of 0.5, and a high complexity value of 1.0, and $C_r$ is a customer request factor and takes a no customer priority value of 0, a medium customer priority value of 1, and a high customer priority value of 2, and where, $$P = \frac{t_p}{TAT},$$

where, P is an aging priority of a sub-step job calculated by the system, TAT is a turn around time for the sub-step job, and $t_p$ is time passed after starting the job.

In another embodiment, the demand side factor calculation includes calculating the demand side factor for each sub-step associated with the job using the formula:

$$ds_f = \frac{SHT}{TAT} \times \frac{1}{y_n},$$

where, $ds_f$ is the demand side factor, SHT is a standard handling time of performing a particular sub-step job, TAT is a turn around time to complete the sub-step job, including handling times and waiting times, and $y_n$ is number of agents suitable to handle the sub-step job.

Further, the transportation matrix generation and solution includes generating an n×m matrix, where, n represents demand side and m represents supply side, and solving the transportation matrix using the formula:

$$\text{maximize } Z = \sum_{i=1}^{m} \sum_{j=1}^{n} Fij \times Xij,$$

where, $F_{ij}$ is a product of the demand side factor ($ds_f$) of the $j^{th}$ sub-step and the supply side factor ($\eta$) of the $i^{th}$ agent and $X_{ij}$ is number of the $j^{th}$ column sub-step job assigned to the $i^{th}$ row agent, subjected to constrain equations:

$$\sum_{j=1}^{n} Xij = a_i, i = 1, 2, \ldots, m,$$

$$\sum_{i=1}^{m} Xij = b_j, j = 1, 2, \ldots, n, \text{ and}$$

$$\sum_{i=1}^{m} a_i = \sum_{j=1}^{n} b_j.$$

The following are the possibilities in the constrain equations:

1) If $$\sum_{i=1}^{m} a_i = \sum_{j=1}^{n} b_j,$$

then the transportation matrix is balanced since jobs allocated cannot be more than agents' capacity.

2) If $$\sum_{i=1}^{m} a_i > \sum_{j=1}^{n} b_j,$$

then the agents having a scope to process additional jobs are selected.

3) If $$\sum_{i=1}^{m} a_i < \sum_{j=1}^{n} b_j,$$

then top jobs of the jobs based on respective demand side factors are selected and a remainder of the jobs are left for later cycle of optimal allocation Further, in operation 808, agent-specific job queues are automatically generated based on the number of jobs.

Figure 9:
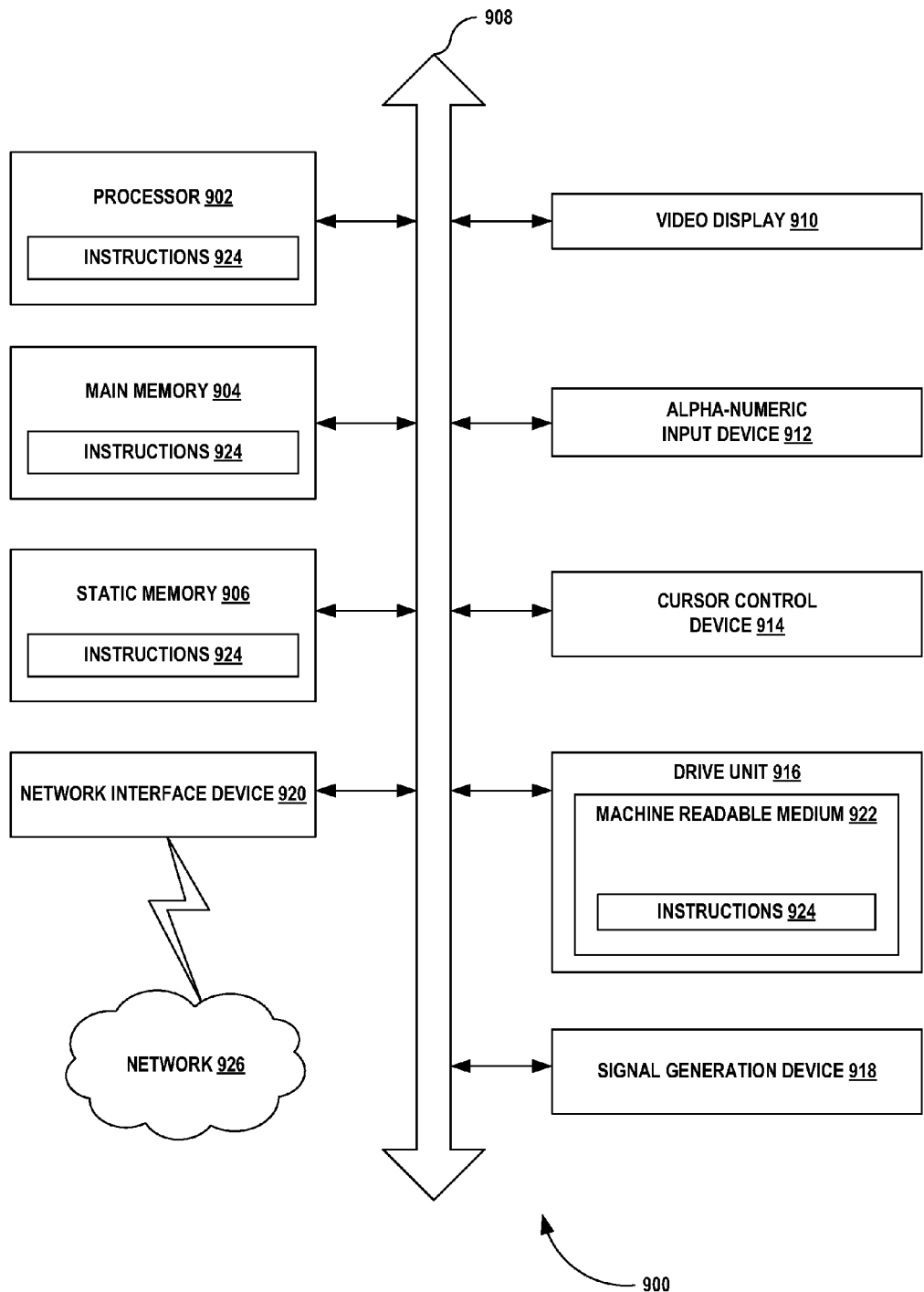
FIG. 9 illustrates a diagrammatic system view of a data processing system in which any of the embodiments disclosed herein may be performed, according to one embodiment.

FIG. 9 illustrates a diagrammatic system view 900 of a data processing system in which any of the embodiments disclosed herein may be performed, according to one embodiment. Particularly, the diagrammatic system view of FIG. 9 illustrates a processor 902, a main memory 904, a static memory 906, a bus 908, a video display 910, an alpha-numeric input device 912, a cursor control device 914, a drive unit 916, a signal generation device 918, a network interface device 920, a machine readable medium 922, instructions 924 and a network 926.

The diagrammatic system view 900 may indicate a personal computer and/or a data processing system in which one or more operations disclosed herein are performed. The processor 902 may be a microprocessor, a state machine, an application specific integrated circuit, a field programmable gate array, etc. The main memory 904 may be a dynamic random access memory and/or a primary memory of a computer system. The static memory 906 may be a hard drive, a flash drive, and/or other memory information associated with the data processing system.

The bus 908 may be an interconnection between various circuits and/or structures of the data processing system. The video display 910 may provide graphical representation of information on the data processing system. The alpha-numeric input device 912 may be a keypad, keyboard and/or any other input device of text, e.g., a special device to aid the physically handicapped. The cursor control device 914 may be a pointing device such as a mouse. The drive unit 916 may be a hard drive, a storage system, and/or other longer term storage subsystem.

The signal generation device 918 may be a BIOS and/or a functional operating system of the data processing system. The network interface device 920 may perform interface functions, e.g., code conversion, protocol conversion, and/or buffering required for communications to and from the network 926 between a number of independent devices, e.g., of varying protocols. The machine readable medium 922 may provide instructions on which any of the methods disclosed herein may be performed. The instructions 924 may provide source code and/or data code to the processor 902 to enable any one or more operations disclosed herein.

For example, a storage medium having instructions, that when executed by a computing platform, result in execution of a method of allocating jobs to an agent, the method includes defining, for each job, a job type associated with a job and a sub-step associated with the job, determining eligibility to perform the sub-step by an agent, determining, based on the eligibility determination, a number of jobs of each job type to be performed by the agent, and automatically generating, based on the number of jobs, agent-specific job queues.

In some embodiments, the determination of the number of jobs includes calculating a supply side factor for each agent, calculating a demand side factor for each sub-step associated with a job, and generating and solving, using the supply side factor and the demand side factor, a transportation matrix. In one embodiment, the supply side factor calculation includes calculating the supply side factor for each agent of the agents using the formula:

$$\eta = \alpha \times \beta,$$

where, $\eta$ is the supply side factor, $\alpha$ is a direct work efficiency and $\beta$ is an indirect work efficiency/productivity, and where, $$\alpha = \frac{W - Wr}{W},$$

where, W is number of hours worked by an agent, Wr is number of hours spent in rework activities, and where, $$\beta = \frac{J_a}{J_d},$$

where, $J_a$ is number of jobs done by a particular agent in a day, and $J_d$ is average number of jobs done by all agents. In one embodiment, the demand side factor calculation includes calculating the demand side factor for each sub-step associated with the jobs using the formula:

$$ds_f = P \times C_x \times C_r,$$

where, $ds_f$ is the demand side factor, $C_x$ is a complexity factor and takes a normal complexity value of 0, a medium complexity value of 0.5, and a high complexity value of 1.0, and $C_r$ is a customer request factor and takes a no customer priority value of 0, a medium customer priority value of 1, and a high customer priority value of 2, and where, $$P = \frac{t_p}{TAT},$$

where, P is an aging priority of the sub-step job calculated by the system, TAT is a turn around time for the sub-step job, and $t_p$ is a time passed after starting the job. Further, the transportation matrix generation and solution includes generating an n×m matrix, where, n represents the demand side and m represents the supply side and solving the transportation matrix using the formula:

$$\text{maximize } Z = \sum_{i=1}^{m} \sum_{j=1}^{n} Fij \times Xij,$$

where, $F_{ij}$ is a product of the demand side factor ($ds_f$) of the $j^{th}$ sub-step and the supply side factor ($\eta$) of the $i^{th}$ agent and $X_{ij}$ is number of the $j^{th}$ column sub-step job assigned to the $i^{th}$ row agent.

subjected to constrain equations:

$$\sum_{j=1}^{n} Xij = a_i, \quad i = 1, 2, \ldots, m,$$

$$\sum_{i=1}^{m} Xij = b_j, \quad j = 1, 2, \ldots, n,$$

and $$\sum_{i=1}^{m} a_i = \sum_{j=1}^{n} b_j.$$

The following are the possibilities in the constrain equations:

1) If $$\sum_{i=1}^{m} a_i = \sum_{j=1}^{n} b_j,$$

then the transportation matrix is balanced since jobs allocated cannot be more than agents' capacity.

2) If $$\sum_{i=1}^{m} a_i > \sum_{j=1}^{n} b_j,$$

then the agents having a scope to process additional jobs are selected.

3) If $$\sum_{i=1}^{m} a_i < \sum_{j=1}^{n} b_j,$$

then top jobs of the jobs based on respective demand side factors are selected and a remainder of the jobs are left for later cycle of optimal allocation.

The above-described method and system of allocating jobs to an agent, which is based on algorithms, provide the most optimum allocation of multi-step jobs since business and process requirements are considered at the time of mapping of the multi-step jobs to the agent. In one embodiment, the mapping is done in such a way that the act of allocation of the jobs leads to highest throughput of jobs in the system with required quality level and cost.

The above-described method and system allocate the jobs to the agents till their maximum capacity is reached in an optimum manner under the constraint of maximum utilization of resources. Further, the above-described method and system ensure that the most critical job is allocated to the most skilled agent by using the complexity factor and the customer request factor for calculating the demand side factor. In addition, the above-described technique allocates the jobs to the agents in such a way that probability of meeting the business objectives is maximized. Further, the above-described technique allows more than one sub-step job to be assigned to the agent. Furthermore, the above-described technique allows the agent to be authorized to perform the sub-steps from more than one job type.

Also, the method may be in a form of a machine-readable medium embodying a set of instructions that, when executed by a machine, cause the machine to perform any method disclosed herein. It will be appreciated that the various embodiments discussed herein may not be the same embodiment, and may be grouped into various other embodiments not explicitly disclosed herein.

In addition, it will be appreciated that the various operations, processes, and methods disclosed herein may be embodied in a machine-readable medium and/or a machine accessible medium compatible with a data processing system, e.g., a computer system, and may be performed in any order, e.g., including using means for achieving the various operations. Accordingly, the specification and drawings are to be regarded in an illustrative rather than a restrictive sense.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated circuitry (ASIC)).

What is claimed is:

1. A method for allocating jobs to an agent, comprising:

defining using a computer, for each job of the jobs, a job type associated with at least one job and at least one sub-step associated with the at least one job;

determining by the computer eligibility of agents to perform the at least one sub-step;

dynamically determining by the computer, based on the eligibility determination, a number of sub-steps of each job type to be performed by each agent, wherein the number of sub-steps determination comprises:

calculating, for each agent of the agents, a supply side factor, comprising:

calculating the supply side factor for each agent of the agents using the formula;

$$\eta = \alpha \times \beta,$$

where, $\eta$ is the supply side factor, $\alpha$ is a direct work efficiency, $\beta$ is an indirect work efficiency/productivity, and where, $$\alpha = \frac{W - Wr}{W},$$

where, W is number of hours worked by an agent, Wr is number of hours spent in rework activities, and where, $$\beta = \frac{J_a}{J_d},$$

where, $J_a$ is number of jobs done by a particular agent in a day, and $J_d$ is average number of jobs done by all agents;

calculating, for each sub-step associated with a job, a demand side factor, comprising:

calculating the demand side factor for each sub-step associated with the job using the formula:

$$ds_f = \frac{SHT}{TAT} \times \frac{1}{y_n},$$

where, $ds_f$ is the demand side factor, SHT is a standard handling time of performing a particular sub-step job, TAT is a turn around time to complete the sub-step job, including handling times and waiting times, and $y_n$ is number of agents suitable to handle the sub-step job; and automatically allocating each of the sub-steps associated with each job to the agents by generating and solving, using the supply side factor and the demand side factor, a transportation matrix; and automatically generating by the computer, based on the number of sub-steps, agent-specific job queues.

2. The method of claim 1, wherein the eligibility determination comprises a user interface to authorize the agent to perform the job.

3. The method of claim 1, wherein the transportation matrix generation and solution comprises:

generating an n×m matrix, where, n represents demand side and m represents supply side; and solving the transportation matrix using the formula:

$$\text{maximize } Z = \sum_{i=1}^{m} \sum_{j=1}^{n} Fij \times Xij,$$

where, $F_{ij}$ is a product of the demand side factor ($ds_f$) of $j^{th}$ sub-step and the supply side factor ($\eta$) of $i^{th}$ agent and $X_{ij}$ is number of $j^{th}$ column sub-step job assigned to $i^{th}$ row agent, subjected to constrain equations:

$$\sum_{j=1}^{n} Xij = a_i, \quad i = 1, 2, \ldots, m,$$

$$\sum_{i=1}^{m} Xij = b_j, \quad j = 1, 2, \ldots, n,$$

and $$\sum_{i=1}^{m} a_i = \sum_{j=1}^{n} b_j.$$

if $$\sum_{i=1}^{m} a_i > \sum_{j=1}^{n} b_j,$$

selecting agents having a scope to process additional jobs, else if $$\sum_{i=1}^{m} a_i < \sum_{j=1}^{n} b_j,$$

selecting top jobs of the jobs based on respective demand side factors and leaving a remainder of the jobs for a later cycle of optimal allocation.

4. A method for allocating jobs to an agent, comprising:

defining using a computer, for each job of the jobs, a job type associated with at least one job and at least one sub-step associated with the at least one job;

determining by the computer eligibility of agents to perform the at least one sub-step;

dynamically determining by the computer, based on the eligibility determination, a number of sub-steps of each job type to be performed by each agent, wherein the number of sub-steps determination comprises:

calculating, for each agent of the agents, a supply side factor, comprising:

calculating the supply side factor for each agent of the agents using the formula:

$$\eta = \alpha \times \beta,$$

where, $\eta$ is the supply side factor, $\alpha$ is a direct work efficiency, $\beta$ is an indirect work efficiency/productivity, and where, $$\alpha = \frac{W - Wr}{W},$$

where, W is number of hours worked by an agent, Wr is number of hours spent in rework activities, and where, $$\beta = \frac{J_a}{J_d},$$

where, $J_a$ is number of jobs done by a particular agent in a day, and $J_d$ is average number of jobs done by all agents;

calculating, for each sub-step associated with a job, a demand side factor, wherein the demand side factor calculation comprises:

calculating the demand side factor for each sub-step associated with the job using the formula:

$$ds_f = P \times C_x \times C_r,$$

where, $ds_f$ is the demand side factor, $C_x$ is a complexity factor having a first value selected from the group consisting essentially of a normal complexity value=0, a medium complexity value=0.5 and a high complexity value=1.0, and $C_r$ is a customer request factor having a second value selected from the group consisting essentially of a no customer priority value=0, a medium customer priority value=1, and a high customer priority value=2, and where, $$P = \frac{t_p}{TAT},$$

where, P is an aging priority of the sub-step job calculated by a system, TAT is a turn around time for the sub-step job, and $t_p$ is time passed after starting the job; and automatically allocating each of the sub-steps associated with each job to the agents by generating and solving, using the supply side factor and the demand side factor, a transportation matrix; and automatically generating by the computer, based on the number of sub-steps, agent-specific job queues.

5. The method of claim 4, wherein the eligibility determination comprises a user interface to authorize the agent to perform the job.

6. The method of claim 4, wherein the transportation matrix generation and solution comprises:

generating an n×m matrix, where, n represents demand side and m represents supply side; and solving the transportation matrix using the formula:

$$\text{maximize } Z = \sum_{i=1}^{m} \sum_{j=1}^{n} Fij \times Xij,$$

where, $F_{ij}$ is a product of the demand side factor ($ds_f$) of $j^{th}$ sub-step and the supply side factor ($\eta$) of $i^{th}$ agent and $X_{ij}$ is number of $j^{th}$ column sub-step job assigned to $i^{th}$ row agent, subjected to constrain equations:

$$\sum_{j=1}^{n} Xij = a_i, \quad i = 1, 2, \ldots, m,$$

$$\sum_{i=1}^{m} Xij = b_j, \quad j = 1, 2, \ldots, n,$$

and $$\sum_{i=1}^{m} a_i = \sum_{j=1}^{n} b_j.$$

if $$\sum_{i=1}^{m} a_i > \sum_{j=1}^{n} b_j,$$

selecting agents having a scope to process additional jobs, else if $$\sum_{i=1}^{m} a_i < \sum_{j=1}^{n} b_j,$$

selecting top jobs of the jobs based on respective demand side factors and leaving a remainder of the jobs for a later cycle of optimal allocation.

7. A system for allocating jobs to an agent, comprising:
a processor;
memory coupled to the processor, wherein the memory comprises:
- a definition module to define, for each job of the jobs, a job type associated with at least one job and at least one sub-step associated with the at least one job;
- an eligibility determination module to determine eligibility of agents to perform the at least one sub-step;
- a number determination module to dynamically determine, based on the eligibility determination, a number of sub-steps of each job type to be performed by each agent, wherein the number determination module comprises:
  - a supply side module to calculate, for each agent of the agents, a supply side factor, wherein the supply side module comprises:
    - a supply side factor module to calculate the supply side factor for each agent of the agents using the formula:

$$\eta = \alpha \times \beta,$$

where, $\eta$ is the supply side factor, $\alpha$ is a direct work efficiency, $\beta$ is an indirect work efficiency/productivity, and where, $$\alpha = \frac{W - Wr}{W},$$

where, W is number of hours worked by an agent, Wr is number of hours spent in rework activities, and where, $$\beta = \frac{J_a}{J_d},$$

where $J_a$ is number of jobs done by a particular agent in a day, and $J_d$ is average number of jobs done by all agents;

- a demand side module to calculate, for each sub-step associated with a job, a demand side factor, wherein the demand side module comprises:
    - a demand side factor module to calculate the demand side factor for each sub-step associated with the job using the formula:

$$ds_f = \frac{SHT}{TAT} \times \frac{1}{y_n},$$

where, $ds_f$ is the demand side factor, SHT is a standard handling time of performing a particular sub-step job, TAT is a turn around time to complete the sub-step job, including handling times and waiting times, and $y_n$ is number of agents suitable to handle the sub-step job; and
  - a transportation matrix module to automatically allocate each of the sub-steps associated with each job to the agents by generating and solving, using the supply side factor and the demand side factor, a transportation matrix; and
- a job queue module to automatically generate, based on the number of sub-steps, agent-specific job queues.

8. The system of claim 7, wherein the eligibility determination module comprises a user interface module to authorize the agent to perform the job.

9. The system of claim 7, wherein the transportation matrix module comprises:
- a supply and demand matrix module to generate an n×m matrix, where, n represents the demand side and m represents the supply side; and
- a solution module to solve the transportation matrix using the formula:

$$\text{maximize} Z = \sum_{i=1}^{m} \sum_{j=1}^{n} Fij \times Xij,$$

where, $F_{ij}$ is a product of the demand side factor ($ds_f$) of $j^{th}$ sub-step and the supply side factor ($\eta$) of $i^{th}$ agent and $X_{ij}$ is number of $j^{th}$ column sub-step job assigned to $i^{th}$ row agent, subjected to constrain equations:

$$\sum_{j=1}^{n} Xij = a_i, \quad i = 1, 2, \ldots, m,$$

$$\sum_{i=1}^{m} Xij = b_j, \quad j = 1, 2, \ldots, n,$$

and $$\sum_{i=1}^{m} a_i = \sum_{j=1}^{n} b_j,$$

if $$\sum_{i=1}^{m} a_i > \sum_{j=1}^{n} b_j,$$

selecting agents having a scope to process additional jobs, and
else if $$\sum_{i=1}^{m} a_i < \sum_{j=1}^{n} b_j,$$

selecting top jobs of the jobs based on respective demand side factors and leaving a remainder of the jobs for a later cycle of optimal allocation.

10. A system for allocating jobs to an agent, comprising:
a processor;
memory coupled to the processor, wherein the memory comprises:
- a definition module to define, for each job of the jobs, a job type associated with at least one job and at least one sub-step associated with the at least one job;
- an eligibility determination module to determine eligibility of agents to perform the at least one sub-step;
- a number determination module to dynamically determine, based on the eligibility determination, a number of sub-steps of each job type to be performed by each agent, wherein the number determination module comprises:

a supply side module to calculate, for each agent of the agents, a supply side factor, wherein the supply side module comprises:
a supply side factor module to calculate the supply side factor for each agent of the agents using the formula:

$\eta = \alpha \times \beta$, where, $\eta$ is the supply side factor, $\alpha$ is a direct work efficiency, $\beta$ is an indirect work efficiency/productivity, and where, $$\alpha = \frac{W - Wr}{W},$$

where, W is number of hours worked by an agent, Wr is number of hours spent in rework activities, and where, $$\beta = \frac{J_a}{J_d},$$

where, $J_a$ is number of jobs done by a particular agent in a day, and $J_d$ is average number of jobs done by all agents;
a demand side module to calculate, for each sub-step associated with a job, a demand side factor, wherein the demand side module comprises:
a demand side factor module to calculate the demand side factor for each sub-step associated with the job using the formula:

$ds_f = P \times C_x \times C_r$, where, $ds_f$ is the demand side factor, $C_x$ is a complexity factor having a first value selected from the group consisting essentially of a normal complexity value=0, a medium complexity value=0.5 and a high complexity value=1.0, and $C_r$ is a customer request factor having a second value selected from the group consisting essentially of a no customer priority value=0, a medium customer priority value=1 and a high customer priority value=2, and where, $$P = \frac{t_p}{TAT},$$

where, P is an aging priority of the sub-step job calculated by a system, TAT is a turn around time for the sub-step job, and $t_p$ is a time passed after starting the job; and
a transportation matrix module to automatically allocate each of the sub-steps associated with each job to the agents by generating and solving, using the supply side factor and the demand side factor, a transportation matrix; and
a job queue module to automatically generate, based on the number of sub-steps, agent-specific job queues.

11. An article, comprising:
a non-transitory computer-readable storage medium having instructions, that when executed by a computing platform, result in execution of a method of allocating jobs to an agent, comprising:

defining, for each job of the jobs, a job type associated with at least one job and at least one sub-step associated with the at least one job;
determining eligibility of agents to perform the at least one sub-step;
dynamically determining, based on the eligibility determination, a number of sub-steps of each job type to be performed by each agent, wherein the number of sub-steps determination comprises:
calculating, for each agent of the agents, a supply side factor, comprising:
calculating the supply side factor for each agent of the agents using the formula:

$\eta = \alpha \times \beta$, where, $\eta$ is the supply side factor, $\alpha$ is a direct work efficiency, $\beta$ is an indirect work efficiency/productivity, and where, $$\alpha = \frac{W - Wr}{W},$$

where, W is number of hours worked by an agent, Wr is number of hours spent in rework activities, and where, $$\beta = \frac{J_a}{J_d},$$

where $J_a$ is number of jobs done by a particular agent in a day, and $J_d$ is average number of jobs done by all agents;
calculating, for each sub-step associated with a job, a demand side factor, comprising:
calculating the demand side factor for each sub-step associated with the job using the formula:

$$ds_f = \frac{SHT}{TAT} \times \frac{1}{y_n},$$

where, $ds_f$ is the demand side factor, SHT is a standard handling time of performing a particular sub-step job, TAT is a turn around time to complete the sub-step job, including handling times and waiting times, and $y_n$ is number of agents suitable to handle the sub-step job; and
automatically allocating each of the sub-steps associated with each job to the agents by generating and solving, using the supply side factor and the demand side factor, a transportation matrix; and
automatically generating, based on the number of sub-steps, agent-specific job queues.

12. The article of claim 11, wherein the transportation matrix generation and solution comprises:
generating an n×m matrix, where, n represents the demand side and m represents the supply side;
solving the transportation matrix using the formula:

$$\text{maximize} Z = \sum_{i=1}^{m} \sum_{j=1}^{n} Fij \times Xij,$$

where, $F_{ij}$ is a product of the demand side factor ($ds_f$) of $j^{th}$ sub-step and the supply side factor ($\eta$) of $i^{th}$ agent and $X_{ij}$ is number of $j^{th}$ column sub-step job assigned to $i^{th}$ row agent, subjected to constrain equations:

$$\sum_{j=1}^{n} Xij = a_i, \quad i = 1, 2, \ldots, m,$$

$$\sum_{i=1}^{m} Xij = b_j, \quad j = 1, 2, \ldots, n,$$

and $$\sum_{i=1}^{m} a_i = \sum_{j=1}^{n} b_j,$$

if $$\sum_{i=1}^{m} a_i > \sum_{j=1}^{n} b_j,$$

selecting agents having a scope to process additional jobs, else if $$\sum_{i=1}^{m} a_i < \sum_{j=1}^{n} b_j,$$

selecting top jobs of the jobs based on respective demand side factors and leaving a remainder of the jobs for a later cycle of optimal allocation.

13. An article, comprising:
a non-transitory computer-readable storage medium having instructions, that when executed by a computing platform, result in execution of a method of allocating jobs to an agent, comprising:
defining, for each job of the jobs, a job type associated with at least one job and at least one sub-step associated with the at least one job;
determining eligibility of agents to perform the at least one sub-step;
dynamically determining, based on the eligibility determination, a number of sub-steps of each job type to be performed by each agent, wherein the number of sub-steps determination comprises:
calculating, for each agent of the agents, a supply side factor, comprising:
calculating the supply side factor for each agent of the agents using the formula:

$$\eta = \alpha \times \beta,$$

where, $\eta$ is the supply side factor, $\alpha$ is a direct work efficiency, $\beta$ is an indirect work efficiency/productivity, and where, $$\alpha = \frac{W - Wr}{W},$$

where, W is number of hours worked by an agent, Wr is number of hours spent in rework activities, and where, $$\beta = \frac{J_a}{J_d},$$

where $J_a$ is number of jobs done by a particular agent in a day, and $J_d$ is average number of jobs done by all agents;
calculating, for each sub-step associated with a job, a demand side factor, wherein the demand side factor calculation comprises:
calculating the demand side factor for each sub-step associated with the jobs using the formula:

$$ds_f = P \times C_x \times C_r,$$

where, $ds_f$ is the demand side factor, $C_x$ is a complexity factor having a first value selected from the group consisting essentially of a normal complexity value=0, a medium complexity value=0.5 and a high complexity value=1.0, and $C_r$ is a customer request factor having a second value selected from the group consisting essentially of a no customer priority value=0, a medium customer priority value=1 and a high customer priority value=2, and where, $$P = \frac{t_p}{TAT},$$

where, P is an aging priority of the sub-step job calculated by a system, TAT is a turn around time for the sub-step job, and $t_p$ is a time passed after starting the job; and
automatically allocating each of the sub-steps associated with each job to the agents by generating and solving, using the supply side factor and the demand side factor, a transportation matrix; and
automatically generating, based on the number of sub-steps, agent-specific job queues.

* * * * *